US005930824A

United States Patent [19]
Anglin et al.

[11] Patent Number: 5,930,824
[45] Date of Patent: Jul. 27, 1999

[54] SYSTEM AND METHOD FOR DEMAND-BASE DATA RECOVERY

[75] Inventors: Matthew Joseph Anglin, Vail; Anthony Steve Pearson, Tucson; Mark Anthony Sovik, Tucson; Donald Paul Warren, Jr., Tucson, all of Ariz.

[73] Assignee: International Business Machines Corporation, Armonk, N.Y.

[21] Appl. No.: 08/794,062

[22] Filed: Feb. 4, 1997

[51] Int. Cl.[6] .................................................. G06F 12/00
[52] U.S. Cl. ...................... 711/162; 711/162; 707/204; 707/205; 395/181; 395/182.08; 395/183.21; 371/21.1; 345/418
[58] Field of Search .............................. 711/162; 707/204, 707/205; 395/181, 182.08, 183.21; 371/21.1; 345/418

[56] References Cited

U.S. PATENT DOCUMENTS

| | | | |
|---|---|---|---|
| 4,648,031 | 3/1987 | Jenner ...................................... | 364/200 |
| 5,159,597 | 10/1992 | Monahan et al. ........................ | 371/16.1 |
| 5,339,406 | 8/1994 | Carney et al. ............................ | 395/575 |
| 5,537,585 | 7/1996 | Blickenstaff et al. ................... | 707/205 |
| 5,692,155 | 11/1997 | Iskiyan et al. ........................... | 711/162 |
| 5,712,964 | 1/1998 | Kamada et al. .......................... | 345/418 |
| 5,742,792 | 4/1998 | Yanai et al. .............................. | 711/162 |

OTHER PUBLICATIONS

Dictionary of Computing (4th Ed., 1996), Oxford University Press, pp. 32, 173 & 412.
M.A. Sovik et al., "Changed Data Only Backup and Recovery", *IBM Technical Disclosure Bulletin*, vol. 39, No. 03, Mar. 1996, pp. 367–369.

*Primary Examiner*—Tod R Swann
*Assistant Examiner*—Nasser Moazzami
*Attorney, Agent, or Firm*—Gray Cary Ware Freidenrich

[57] ABSTRACT

A system and method for demand-based data recovery operating in a computerized data processing system that includes a computer platform operable under the control of system data, including system programs, catalogs, directories, inventories and the like, and one or more user applications operable in conjunction with user data. The data processing system includes a data backup and recovery system for periodically transferring data between one or more primary data storage resources and one or more secondary data storage resources. The demand-based system and method operate to recover data from the secondary data storage resources to the primary data storage resources following a disaster event resulting in the loss of all or a portion of the data on the primary data storage resources. In accordance therewith, the system data is first recovered from the secondary data storage resources to the primary data storage resources. Execution of the one or more user applications is next commenced but the user data is not immediately recovered. Only if the application requests non-recovered user data will the requested data be recovered from the secondary data storage resources to the primary data storage resources. The demand-based system and method can be adapted to recover entire data sets (e.g. files) from a previous full backup or it can recover data subsets (e.g. records) in either a full backup mode or a change-data-only mode.

21 Claims, 10 Drawing Sheets

SYSTEM AND METHOD FOR DEMAND-BASE DATA RECOVERY

BACKGROUND OF THE INVENTION

1. Field Of The Invention

The present invention is directed generally to data storage in a computerized data processing system, and more particularly, to the recovery of critical data following an unexpected disaster event resulting in data unavailability or loss.

2. Description Of The Related Art

When an unexpected disaster resulting in data unavailability or loss strikes a data processing system, recovery procedures must be implemented to restore the system to a pre-disaster useable state. This is typically accomplished by recovering data that was previously backed up prior to the disaster. The backed-up data is generally stored in one or more secondary or tertiary storage systems that are physically separate from the primary data storage systems and immune from the disaster event affecting the primary systems. It is the job of the system administrator and/or the applications user to periodically back up all necessary data required by the data processing enterprise, including operating system programs and data, catalogs, directories, inventories, user programs and user data. These data may be backed up to one or more magnetic tapes or tape cartridges, magnetic disks, or optical disks which may have ablative, phase-change, magneto-optic or any other optical recording layers thereon. These backup data storage media may be housed in one or more automated data storage libraries having a plurality of storage cells containing such media, one or more drives to transfer data to and from the media, and automated picker/gripper mechanisms to physically transport the media between their individual storage cells and the one or more drives.

Disaster recovery in a data processing system often represents a critical time challenge to recover enough data to initiate the critical applications needed to run a data processing enterprise as soon as possible after a disaster has been declared. This may be needed after the loss of an entire data center, or just a significant portion of the data. The conventional method involves recovering all data to a base level, followed by, if necessary, forward recovery processing to prepare the data for use. For data sets maintained as a series of integral files preparation may involve re-submitting transactions or data updates that were recorded after the base level backup, up to and including the synchronization point, i.e., the time at which the disaster occurred. Another method for maintaining data sets is known as Changed Data Only (CDO) Recovery. This method was developed by the assignee of the present application. According to the CDO recovery method, an entire data set is initially backed up. Subsequent backup versions of the data set consist of only the changed portions of the data set representing subset units of data (data subsets) actually written by applications subsequent to the initial backup. For data sets maintained by CDO sessions, data set preparation following a complete data set loss (i.e., the current version of the data set is no longer valid) consists of restoring the base level backup and then applying the data subset changes that occurred between the base level backup and the desired recovery version and then using this reconstructed version to complete the recovery. This is known as a full backup mode. For disasters where the current data set remains structurally valid, CDO recovery to a given version can be performed by merely restoring the data subsets that have changed since the desired version. This is known as the change-data-only recovery mode.

Studies have shown that for a significant portion of data, the base level backup is an exact match for the synchronization point, and that only a small position of the data requires the application of changes. A problem occurs, however, because the systems manager is unable to predict which data will be needed by which application following the disaster. This compels the systems manager to recover all data that existed at the time of the disaster. For example, a small mainframe data processing center having 500 GB of data, this could take as much as 72 hours. During that time, all or a portion of the applications running on the data processing system will be inoperable and/or unable to access their data. For larger centers the recovery process will take even longer, and the risk of financial losses will become more substantial.

Accordingly, one cannot rely on conventional recovery processes when immediate access to data is necessary following a disaster. An improved method is needed to ensure that applications requiring data do not have to unnecessarily wait to gain access to their data. What is required is an efficient method for allowing a critical application to obtain its data on a timely basis without otherwise disrupting the recovery process.

SUMMARY OF THE INVENTION

In view of the foregoing, the principal object of the present invention is to provide an improved data recovery system and method that allows data to be recovered on an as-needed demand basis even though complete recovery of all data has not yet occurred.

Another object of the present invention is to provide a data recovery system and method that allows data to be recovered on an as-needed demand basis on both a full data set basis and on a data subset basis using CDO recovery.

Another object of the present invention is to provide a data recovery system and method wherein only system data (programs, catalogs, directories, inventories) are recovered initially, and wherein critical applications are then started and their data is recovered, on demand, even though complete recovery of all data has not yet occurred.

Still another object of the present invention is to provide an improved data recovery system and method wherein, to the end user, it will appear as if all data needed for the user's application(s) has already been recovered even though complete recovery of all data has not yet occurred.

These and other objects are accomplished by a demand-based recovery system and method operating in a computerized data processing system that includes a computer platform operable under the control of system data, including system programs, catalogs, directories, inventories and the like, and one or more user applications operable in conjunction with user data. The data processing system includes a data backup and recovery system for periodically transferring data between one or more primary data storage resources and one or more secondary data storage resources. The demand-based system and method operate to recover data from the secondary data storage resources to the primary data storage resources following a disaster event resulting in the loss of all or a portion of the data on the primary data storage resources. In accordance therewith, the system data is first recovered from the secondary data storage resources to the primary data storage resources. Execution of the one or more user applications is next commenced but the user data is not immediately recovered.

Only if the application requests non-recovered user data will the requested data be recovered from the secondary data storage resources to the primary data storage resources. The demand-based system and method can be adapted to recover entire data sets (e.g. files) from a previous full backup or it can recover data subsets (e.g. records) in either a full backup mode or a change-data-only mode.

BRIEF DESCRIPTION OF THE DRAWINGS

The objects, advantages and features of the present invention will be more clearly understood by reference to the following detailed disclosure and the accompanying drawings in which.

DETAILED DESCRIPTION OF THE PREFERRED EMBODIMENTS

A. HARDWARE ENVIRONMENT

Figure 1:
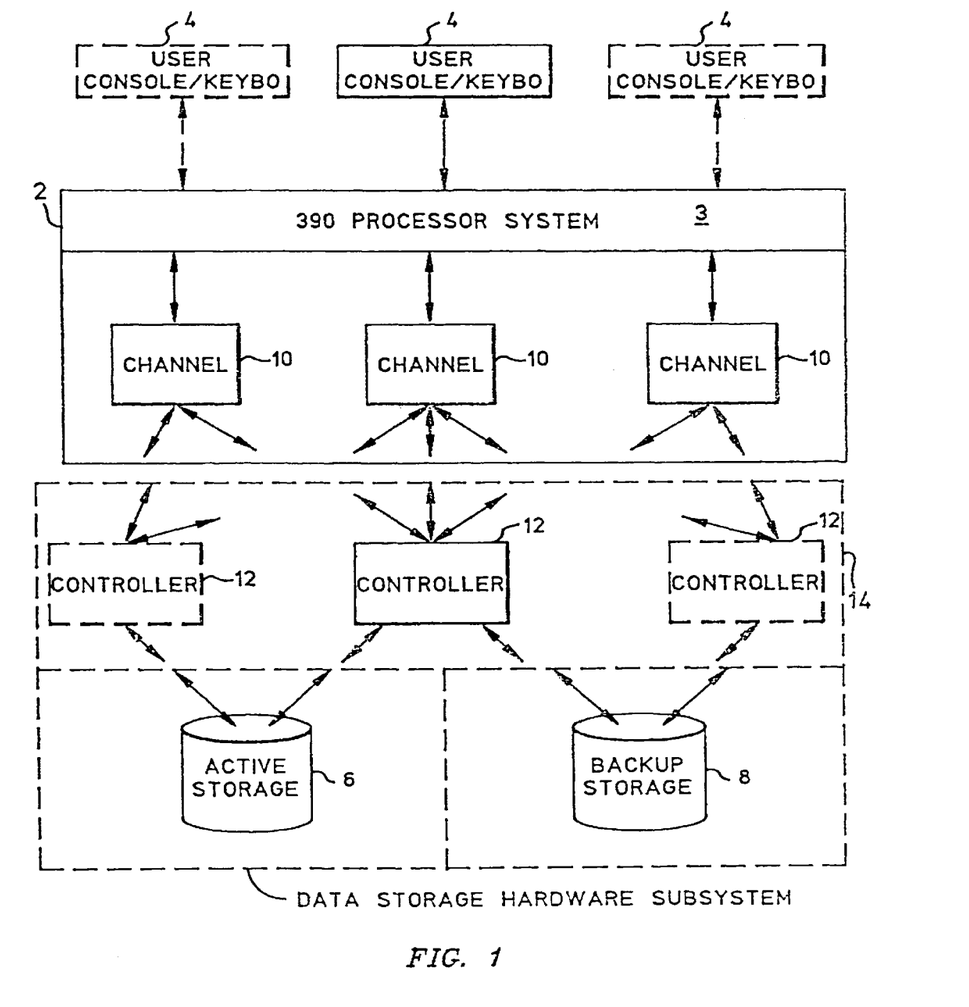
FIG. 1 is a block diagram showing hardware components in a data processing system constructed in accordance with the present invention.

Referring now to the drawings wherein like reference numerals designate like or similar parts throughout the several views, there is illustrated in FIG. 1 a data processing system 2. The data processing system 2 may be provided by any of the well known computer platforms running a variety of well known operating systems. Possibilities include, but are not limited to, personal computers running the OS/2 operating system (OS/2 is a trademark of International Business Machines Corporation), workstations running the AIX operating system (AIX is a trademark of International Business Machines Corporation), minicomputers running the OS/400 operating system (OS/400 is a trademark of International Business Machines Corporation), and mainframe computers running the OS/390 operating system (OS/390 is a trademark of International Business Machines Corporation).

In the preferred embodiment of the present invention, the data processing system 2 is a mainframe system powered by one or more IBM S/390 processors running the MVS/ESA (Multiple Virtual Storage/Enterprise Systems Architecture [MVS/ESA is a trademark of International Business Machines Corporation]) operating system. The data processing system may include a single IBM S/390 processor 3 or may be formed from a plurality of such processors forming what is known in the art as a processor "sysplex." The architecture of the IBM S/390 processor 3 and the operational characteristics of the MVS operating system are well documented and need not be described in detail herein. It is sufficient for purposes of the present invention to note that the data processing system 2 allows multiple simultaneous users to provide input to and receive output from the system via multiple console/keyboard units 4 (which may include dumb terminals, smart terminals, other computers, etc.), such that the users are able to run applications that manipulate data stored on one or more storage devices, such as the primary storage repository 6 and the secondary storage repository 8.

The primary storage repository 6 is preferably a logical storage group containing one or more DASD (Direct Access Storage Device) devices that store data sets actively being used by the operating system and the applications running thereunder. The primary storage repository is often referred to as active DASD storage. The secondary storage repository 8 may include a collection of DASD devices and/or tape drives/libraries and/or any other arrangement of suitable and relatively inexpensive storage devices. The secondary storage repository 8 is used to store backup copies of the data stored in the active DASD storage 6 and hence may be referred to as backup storage 8. The backup storage 8 could be local to the data processing system 2, or could be located on another IBM S/390 data processing system, or could reside on some other local or remote hardware platform. Other storage devices (not shown in FIG. 1) might include a migration storage repository for storing migrated data sets containing infrequently used data, and an archive storage repository for storing archived data sets containing archived data versions. There are many-off-the shelf products which can be used to provide the foregoing storage repositories. For the active DASD storage 6, IBM model 3390, and its variants may be used, among others. For the backup storage 8, an IBM model 3494/3495 automated tape library may be used, among others.

As is conventional in IBM mainframe systems, requests for data I/O communication between the IBM S/390 processor(s) 3 and the data storage repositories 6 and 8 are implemented through one or more I/O channels 10 and one or more controllers 12. The channels 10 execute channel programs written by the operating system for performing I/O requests. The channels 10 pass I/O instructions to the controllers 12 which then implement I/O operations on the storage devices and report back the status of such operations to the operating system. Off-the-shelf products which can be used to provide these components include the IBM model 3390 channel system and the 9343/9345 and controller systems, respectively, among others. These devices include local programmable data processors for controlling the I/O functions performed thereby. There are many variations in the way the channels 10, the controllers 12 and the storage repositories 6 and 8 can be arranged to communicate with the IBM S/390 processors(s) 3. Persons skilled in the art will recognize that these variations include channel switching and string switching arrangements. For purposes of the remaining discussion, it will be helpful to refer to the combination of the IBM S390 processor(s) 3 and the channel devices 10 as part of a single data processing system 2. Similarly, the combination of the controllers 12, the active DASD storage 6 and the backup storage 8, will be referred to as a data storage hardware subsystem 14.

B. SOFTWARE ENVIRONMENT

Figure 2A:
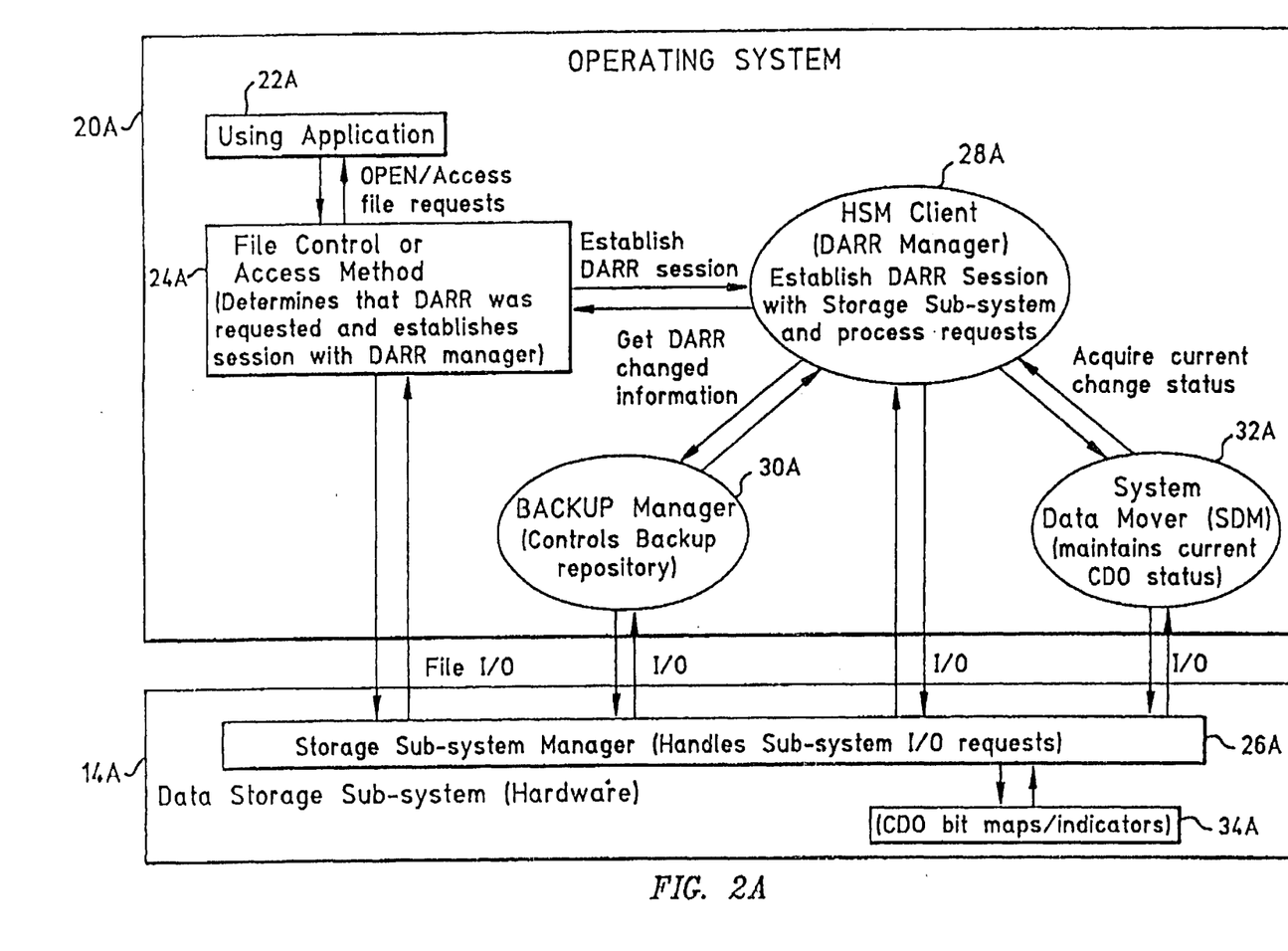
FIG. 2A is a block diagram showing software components in a data processing system constructed in accordance with a first embodiment of the present invention.
Figure 2B:
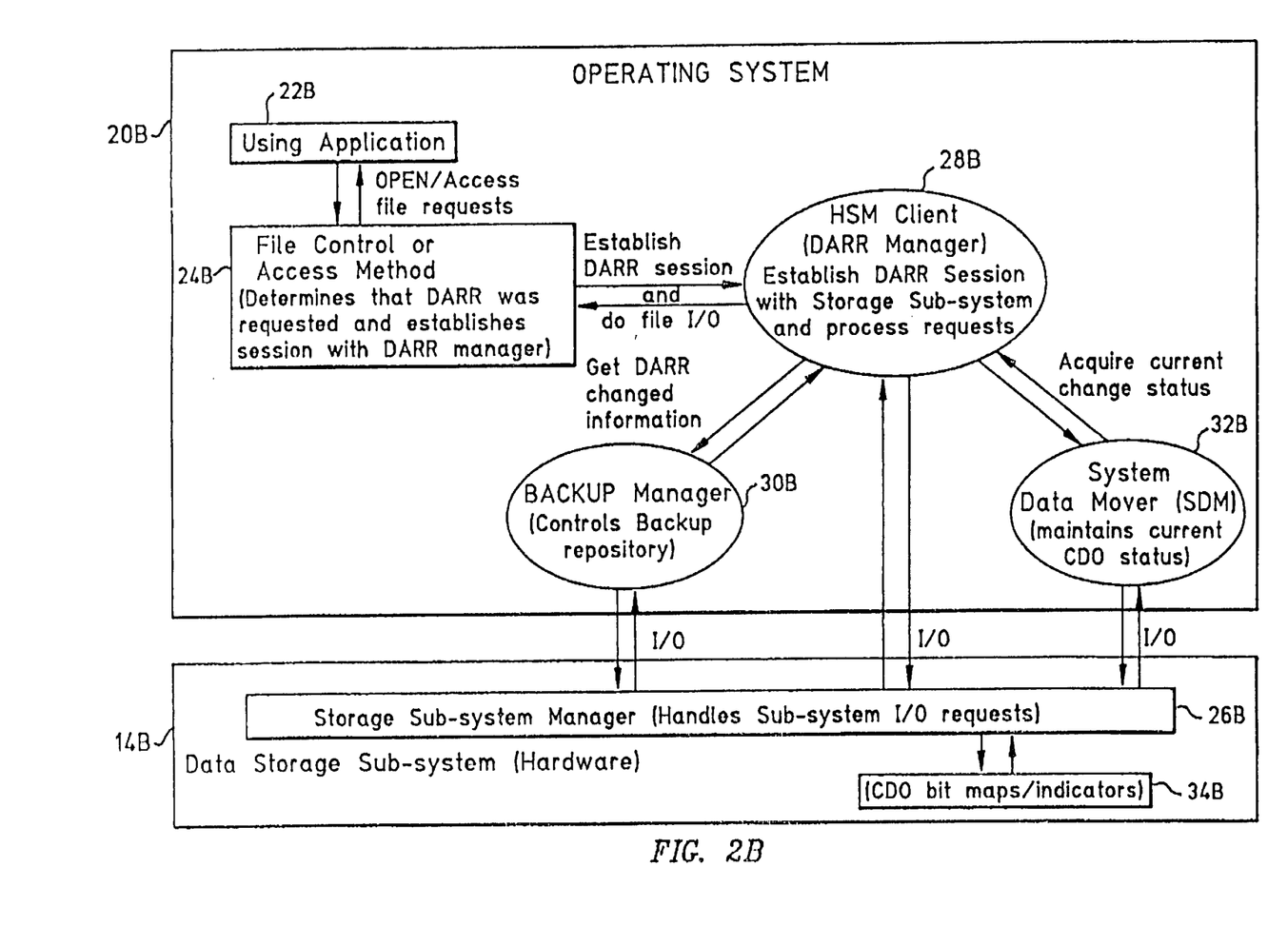
FIG. 2B is a block diagram showing software components in a data processing system constructed in accordance with a second embodiment of the present invention.
Figure 2C:
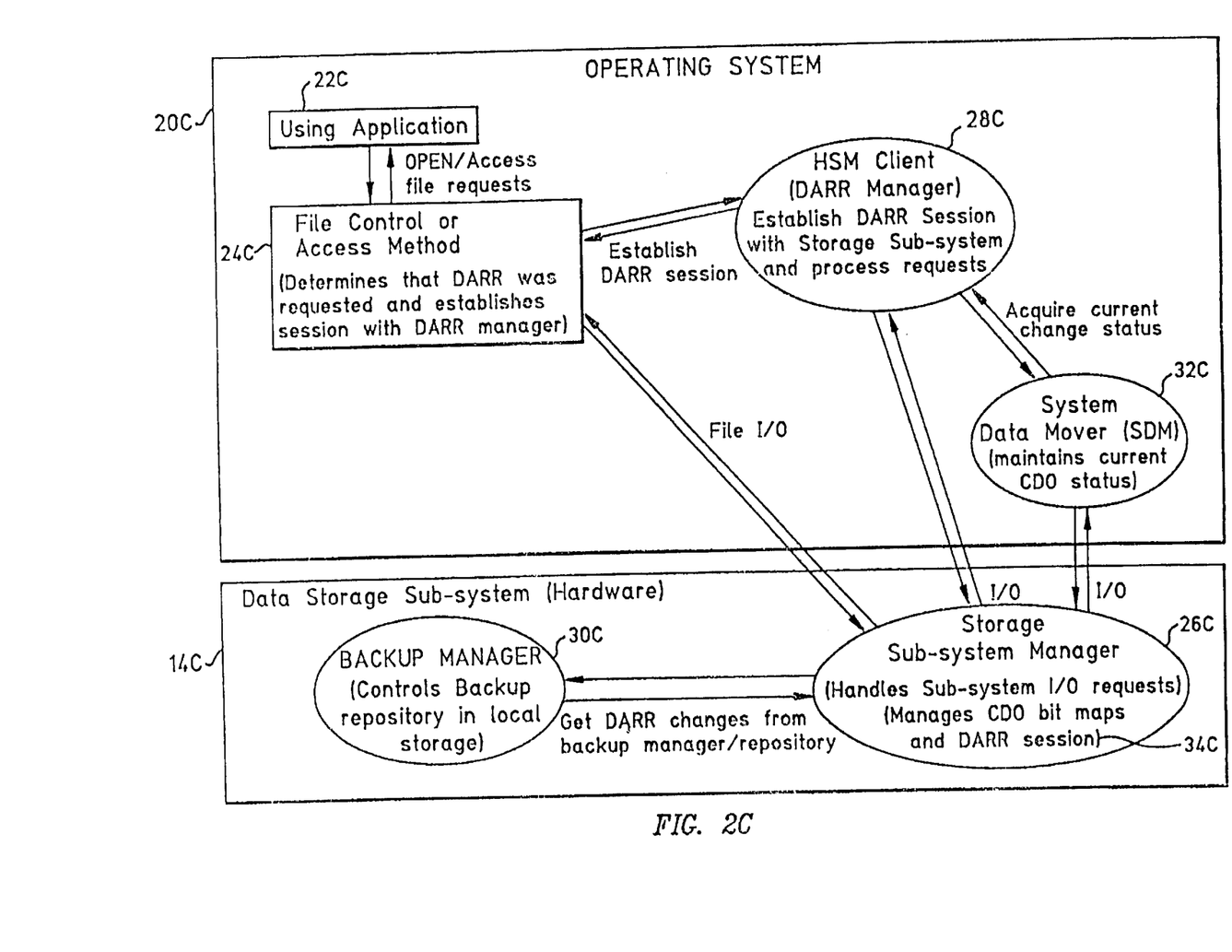
FIG. 2C is a block diagram showing software components in a data processing system constructed in accordance with a third embodiment of the present invention.

In FIGS. 2A, 2B and 2C, the software side of the data processing system 2 is shown in three separate embodiments. In these figures, like components are given like reference numbers, followed by the letters A, B and C, depending on the figure in which each component is shown. Referring now to the embodiment of FIG. 2A only, an MVS operating system 20A provides system services to handle I/O requests from a user application 22A so that the user application can, among other things, send data to and receive data from the data storage hardware subsystem 14A. As is conventional, the user application 22A is responsible for defining the file operation to be performed (e.g. Open, Close, Create, Destroy, Copy, Rename, Read, Write, etc.). The operating system 20A provides standard file system services for handling such requests. These services include the provision of queued and basic access methods, file management, auxiliary storage management and various file integrity mechanisms.

A file control and access module 24A perform the operating system's access methods. As is conventional, the file control and access module 24A can perform a variety of access methods including (1) sequential access methods such as BSAM (Basic Sequential Access Method), and QSAM (Queued Sequential Access Method), (2) direct access methods such as BDAM (Basic Direct Access Method), (3) partitioned access methods such as BPAM (Basic Partioned Access Method) and (4) virtual access methods such as VSAM (Virtual Storage Access Method). In the preferred implementation of the present invention, the file control and access module 24A implements the VSAM access method. The VSAM method can process a variety of data set types including KSDS (Key Sequenced Data Sets), ESDS (Entry-sequenced Data Sets) and RRDS (Relative Record Data Sets). In the preferred implementation of the invention, the VSAM access method is implemented using KSDS data sets. Each KSDS data set record has a key. Records are loaded in key sequence. New records are inserted in key sequence.

A data storage sub-system manager 26A runs on the data storage sub-system 14A. This software executes I/O requests from the operating system 20A in order to perform a data transfer operation on the hardware components of the data storage sub-system 14A. During direct I/O operations involving data sets located on active DASD, data sets are transferred directly between the user application 22A and the data storage sub-system 14A using conventional access methods. In a typical sequence, the user application 22A first describes a data set of interest. Next, the user application 22A issues an OPEN macro to prepare the data set. This is followed by the user application 22A issuing an I/O request to call the access method. The file control and access module 24A builds control blocks and a channel program to describe the request. It then issues an EXCP macro to invoke the data storage sub-system manager 26A. The data storage sub-system manager 26A builds control blocks, fixes pages and translates the channel program. It then schedules or starts operation with an SIO instruction, and returns to the file control and access module 24A. The file control and access module 24A waits for the I/O operation to complete. When the hardware generates an I/O interruption signalling completion of the operation, the data storage sub-system manger 26A analyzes and posts the status of the operation, and then returns to the user application 22A. The user application 22A continues processing when the I/O operation is complete and issues a CLOSE macro when operations on the data set are complete.

In addition to the foregoing I/O components and operations involving direct I/O from active DASD, the operating system of FIG. 2A contains additional components for performing indirect, demand-based I/O for data sets that cannot be found on active DASD. In FIG. 2A, a backup/recovery manager 28A is used for all demand-based recovery from non-active storage. The backup/recovery manager 28A is a hierarchical storage manager (HSM) is used to establish a demand-based recovery session with the data storage sub-system manager 26A and to process all I/O requests for data sets needed by the session. As shown in FIG. 2A, the backup/recovery manager 28A communicates directly with the data storage sub-system manager 26A. To recover data sets from secondary storage, the backup/recovery manager 28A utilizes the services of a backup manager 30A, which in turn communicates with the data storage sub-system manager 26A. The backup manager 30A acts as a server and the backup/recovery manager 28A operates as a client thereof. In this arrangement, it is not necessary for the backup manager 30A to reside on the same system as the backup/recovery manager 28A. Furthermore, it is possible for the backup manager 30A to serve multiple recovery managers. An additional software module used for demand-based recovery is the SDM (system data mover) module 32A. The SDM module 32A communicates with the data storage sub-system manager 26A and maintains information about current file transfer operations for use by the backup/recovery manager 28A.

Referring now to FIG. 2B, the like-numbered components described above in connection with FIG. 2A are essentially the same. The principal difference in FIG. 2B is that the file control and access module 24B performs all of its file I/O (including I/O from active DASD) through the backup/recovery manager 28B, instead of only demand-based recovery as in FIG. 2A. In FIG. 2C, the like-numbered components described above in connection with FIG. 2A are again essentially the same. The principal difference in FIG. 2C is that the backup manager 30C is offloaded to the data storage sub-system 14A and is controlled directly by the data storage sub-system manager 26C. The data storage sub-system manager 26C performs direct I/O operations involving active DASD and most of the demand-based recovery operations. Additional operations of the aforementioned software components used to implement demand-based recovery are described in more detail hereinafter.

C. DRO RECOVERY

Figure 3:
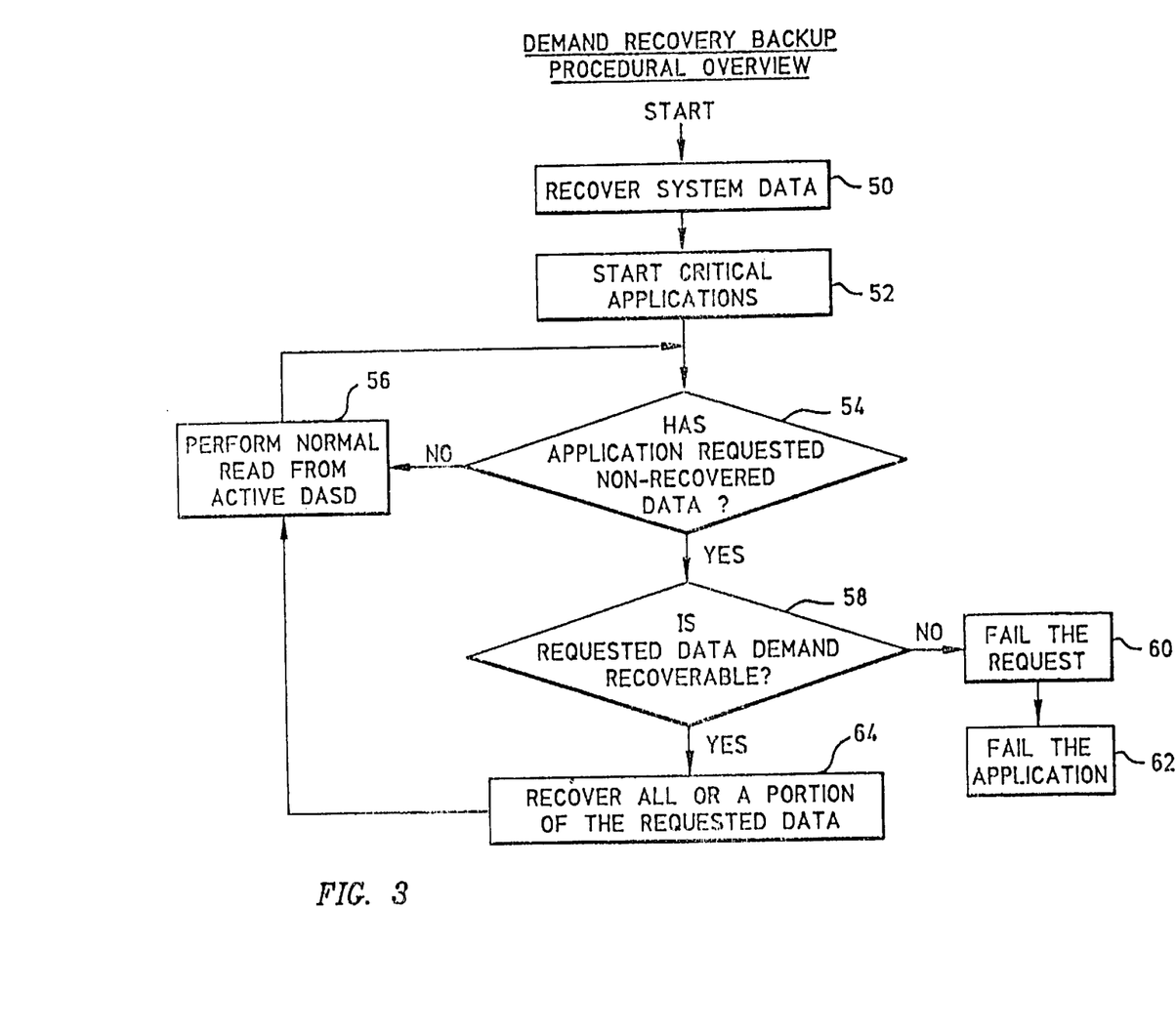
FIG. 3 is a flow diagram showing a sequence of processing steps performed in accordance with one aspect of the present invention.

Referring now to FIG. 3, and with continuing reference to FIGS. 2A, 2B and 2C, a process for demand-based recovery in accordance with one aspect of the present invention is illustrated. In the preferred process, user data is recovered only as it is needed. This solution may be termed "Demand Recovery Option" or DRO. A variation of this process, known as "Demand As-Requested Recovery" or DARR, which employs CDO technology, is described below. In accordance with the DRO process of FIG. 3, it is assumed that a disaster event has occurred which has rendered the data processing system 2 wholly or partially inoperable by virtue of its software processes ceasing to function or due to a loss of system and/or user data on the active DASD storage 6.

In a first step 50, only system data, such as programs, catalogs, directories, inventories and the like, are initially recovered by the system administrator. These initially recovered data sets contain references to locations and methods needed to recover all other data as needed. Depending on the size of the data processing system 2, step 50 should be completed in a few hours or less. In a second step 52, critical user applications, such as the user application 22A (or 22B or 22C), are started by the system administrator and made available to end-users. The Storage Administrator (or equivalent) initiates the demand recovery session. The user applications initiate a demand-based recovery session by accessing a data set that meets the DRO/DARR criteria. The backup/recovery manager 28A (or 28B or 28C) and the data storage sub-system manager 26A (or 26B or 26C) then wait in step 54 until the user application makes an I/O request for data. If the requested data is available on the active DASD storage 6, it is read from that resource in step 56 as part of a normal I/O operation. If the requested data is not found on the active DASD storage 6, i.e., if it is non-recovered, it becomes a candidate for recovery from the backup storage 8. First, however, the backup/recovery manager 28A (or 28B or 28C) determines in step 58 whether the requested data is demand recoverable. If it is not, the request is failed in step 60 and the application is failed in step 62. If the requested data is demand recoverable, it is recovered in whole or in part in step 64. Processing then returns to step 56 so that the recovered data can be read by the user application.

The mechanism employed in step 54 to determine whether the application has requested non-recovered data depends heavily on the computing platform and operating system used. In the case of IBM MVS/ESA mainframe systems, data sets are opened using system services, followed by access to the data using system access methods. Demand-based data recovery can be implemented as an intercept prior to when the data is opened. This is achieved by consulting three tables maintained by the MVS/ESA operating system for controlling primary and secondary storage; namely, the Basic Catalog Structure, the Backup Control Data Set Inventory, and the Migration Control Data Set. The Basic Catalog Structure tracks each data set used by the data processing system 2 and identifies, among other things, the active DASD volume on which the data set resides, or the migration volume to which the data set has been migrated if it is no longer active. The Backup Control Data Set Inventory identifies, among other things, the active DASD volume where each active data set resided when a previous backup occurred, the backup location for the data set, and the date and time of each data set backup. The Migration Control Data Set identifies, among other things, the location of each migrated data set and the date and time of each data set migration.

In order to determine in step 54 whether a requested data set needs to be recovered in an MVS/ESA mainframe system, the following steps are taken as an intercept to the opening of requested data by an application:

1. If the data set is not found in the Basic Catalog Structure nor the Backup Control Data Set Inventory, it is not recovered and the data open operation fails.
2. If the data set is not found in the Basic Catalog Structure, but the Backup Control Data Set indicates that the data was last backed up when cataloged to a certain DASD volume, and the data set is found on that volume, the Basic Catalog Structure is updated with a new catalog entry.
3. If the data set is not found in the Basic Catalog Structure, and the Backup Control Data Set Inventory indicates that it was last backed up when cataloged to a certain DASD volume, but the data set is not found on that volume, the data set needs to be recovered.
4. If the data set is not found in the Basic Catalog Structure, and the Backup Control Data Set Inventory indicates that it was last backed up when cataloged to a certain DASD volume, but that volume does not exist in the current system, the data set needs to be recovered.
5. If the data set is found in the Basic Catalog Structure, and it is indicated that the data set is cataloged to a certain DASD volume, but the data set is not found on that volume, the data set needs to be recovered.
6. If the data set is found in the Basic Catalog Structure, it is indicated that the data set is cataloged to a certain DASD volume, but that volume does not exist in the current system, the data set needs to be recovered.
7. If the data set is found in the Basic Catalog Structure, it is indicated that the data set was migrated to Migration Level 1 DASD, and the Migration Control Data Set indicates that this placement occurred prior to the disaster event, the data set needs to be recovered.
8. If the data set is found in the Basic Catalog Structure, indicating that the data set was migrated to Migration Level 2 tape, and the Migration Control Data Set indicates that this placement occurred prior to the disaster, the data set needs to be recovered.

Demand-based recovery session must be externally initiated by a Storage Administrator or equivalent level person. To determine demand recoverability, reference is needed to a disaster time point in order to distinguish between data sets that existed prior to a disaster and data sets that were created after the disaster. A data set that existed prior to a disaster event is demand recoverable if the following conditions are met:

1. The data set does not currently exist.
2. The most recent backup of the data set exists, and was created before the disaster time point.
3. The data set has not been deleted after the disaster time point.
4. The data set has not been migrated or placed in migrated status after the disaster time point.

The effect of the foregoing conditions is that fewer and fewer data sets will be demand recoverable as each day passes. At some point, the system administrator may decide not to permit the system to perform demand-based recovery, and can choose one of the following actions:

1. Recover the remainder of all data identified as demand recoverable without waiting for an application to request the data.
2. Declare all remaining data lost. End users that require data in this state can perform their own recovery manually.

D. DARR RECOVERY

Figure 4:
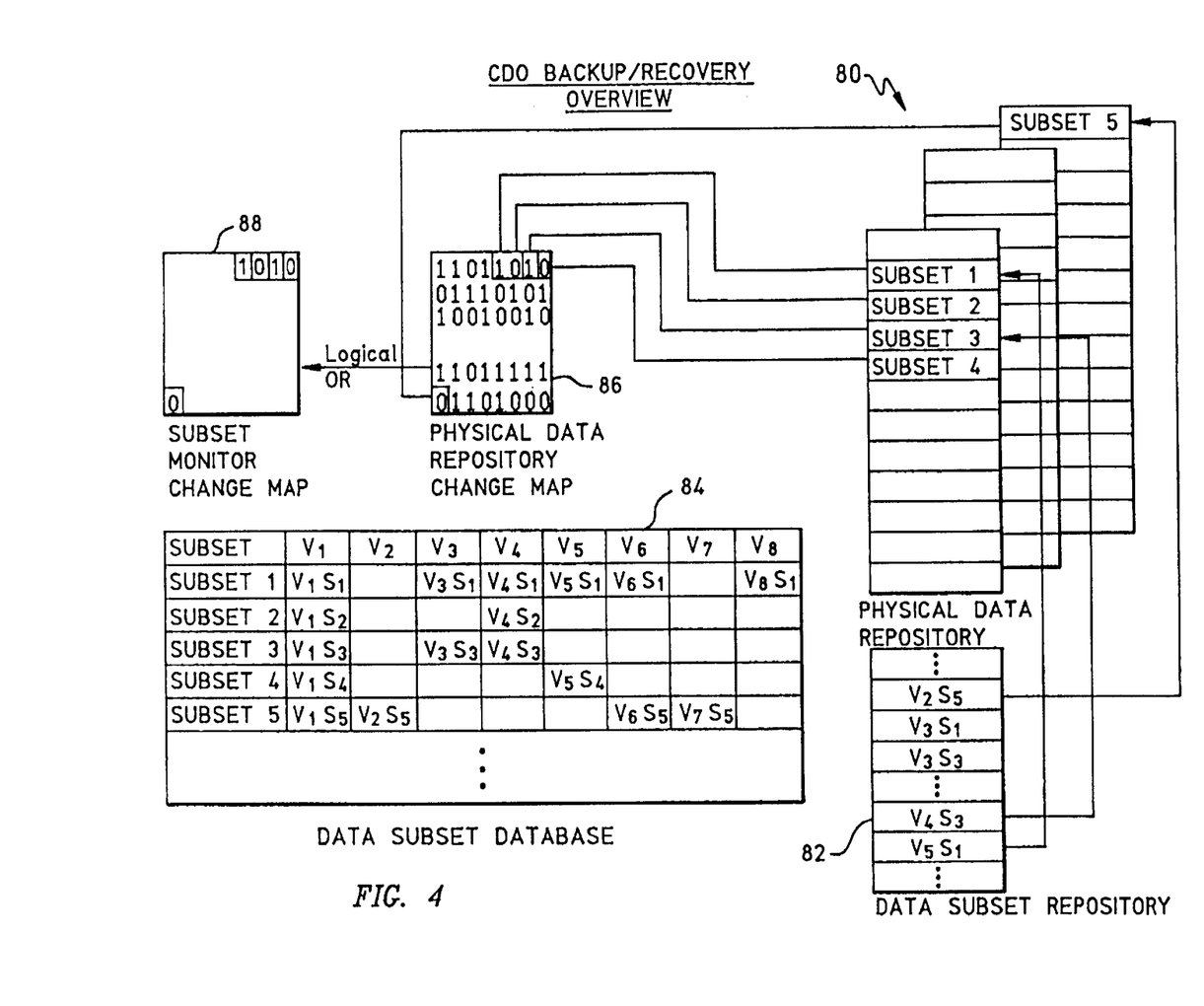
FIG. 4 is a graphical illustration of various tables and maps which may be used in accordance with another aspect of the present invention.

Unlike DRO recovery based on full data sets, DARR recovery provides the ability to recover data subsets using CDO technology, thereby reducing recovery time and making demand-based recovery more efficient. Referring now to FIG. 4, various maps and tables for Change Data Only (CDO) backup and recovery are shown. A CDO backup/recovery procedure is described in detail in IBM Technical Disclosure Bulletin No. 03 (1996), entitled *Changed Data Only (CDO) Recover*. The CDO backup and recovery format described in this publication can be used to complement demand-based recovery in accordance with the present invention in a DARR process. In a CDO backup/recovery system, data subsets, such as tracks, cylinders, segments, control areas (CA), or any other physical or logical entity representing a portion of a file, are backed up and recovered, as opposed to entire data sets such as files. Under CDO, an initial or base level backup is taken of an entire data set. Subsequent backup versions of the data set consist of only the changed portions of the data set, i.e., data subsets. Subsequent recovery of a data set to a given version can be implemented by reconstructing the data set to the desired version, by selecting necessary subsets from its initial backup plus any subsequent subset backups, and then restoring the resulting data set. Alternatively, recovery of a data set to a given version may be implemented by recovering only portions of a requested data set that were changed since the requested backup version, and satisfying read requests for unchanged portions of the data set from active DASD.

In a CDO backup/recovery system, data sets are subdivided into one or more data subsets. A data subset may be a physical entity, such as disk segment or disk track, or may be a logical entity such as a control area in a VSAM data file. In a CDO backup/recovery system, a physical data storage repository is comprised of a collection of uniquely identifiable data subsets representing non-volatile data storage available to an operating system. When an operating system writes file data in the physical repository, it stores the file data in one or more data subsets. In FIG. 4, reference number 80 designates a physical data repository (e.g., DASD storage 6) storing a plurality of data subsets. Reference number 82 designates a backup repository (e.g., backup storage 8) where backup versions of each data subset in the physical data repository 80 are stored. This backup repository is referred to as the data subset repository 82. Each backup for a data set is a version. The data subset repository 82 is available to store each backup version of each data subset stored in the physical data repository 80.

The backup manager 30A (or 30B or 30C) maintains multiple versions of any given data set by recording for each version the one or more data subsets that have changed since the previous version. The backup manager 30A (or 30B or 30C) also maintains a data subset database for tracking each version of the data subsets where data set data is stored. In FIG. 4, reference number 84 designates the data subset database. In this database, the version identified as "$V_1$" represents an initial full backup of an entire data set containing data subsets 1–5. Subsequent versions illustrate data subsets that are changed in that version. Version $V_2$, for example, has a single changed data subset $V_2S_5$, and so on.

In order to track changes made to data subsets between backup and recovery operations, the data storage subsystem manager 26A (or 26B or 26C) maintains a non-volatile physical data repository change map 86 that is stored on the physical repository 80. The physical data repository change map 86 contains an indicator corresponding to each data subset stored in the physical data repository 80. A physical data repository indicator may have one of two states, either "subset changed" or "subset not changed." When the data storage sub-system manager 26A (or 26B or 26C) writes data to a given data subset in the physical data repository 80, the corresponding indicator in the physical repository change map 86 has its state set to "subset changed."

To enable subsequent backup and recovery for a data set, the SDM module 32A (or 32B or 32C) maintains another non-volatile table, referred to as the subset monitor change map 88, which is also stored on the physical data repository 80. Like the physical repository change map 86, the subset monitor change map 88 contains an indicator corresponding to each data subset in the physical data repository 80. Data subsets comprising a data set to be backed up or recovered are identified to the SDM module 32A (or 32B or 32C). When a data subset not currently being monitored is so identified, its corresponding indicator in the subset monitor change map 88 has its state set to "subset changed" to ensure that the data subset will be backed up or recovered.

The SDM module 32A (or 32B or 32C) implements CDO backup and recovery operations under the control of the backup/recovery manager 28A (or 28B or 28C). To create a new backup version of a data set, serialization is first obtained for the data set to prevent any of the data subsets that collectively represent the data set from changing while creating the new backup version. The backup/recovery manager 28A (or 28B or 28C) then determines the data subset extent range for the requested backup. Next, the backup/recovery manager 28A (or 28B or 28C) calls the SDM module 32A (or 32B or 32C) to establish a CDO backup based on the backup data subset extent range. The SDM module 32A (or 32B or 32C) first determines if the data subset range is part of an existing CDO session. If it is, no further processing is required. If it is not, the SDM uses the backup data subset extent range to set the corresponding indicators in the subset monitor change map 88 to "subset changed." The SDM module 32A is then requested to toggle/read the contents of the data storage subsystem manager's physical data repository change map 86 and atomically logically-OR those contents with the contents of its own subset monitor change map 88. This changes the subset monitor change map 88 so that only data subsets within the backup extent range that have been changed since the last backup of the files being monitored have their indicators set to "subset changed." Meanwhile, the toggle will cause the indicators in the physical data repository change map 86 to all be reset to "subset not changed."

The SDM module 32A (or 32B or 32C) is then requested to interrogate the subset monitor change map 88. For each data subset whose indicator is "subset changed," the SDM module 32A (or 32B or 32C) requests the data storage sub-system manager 26A (or 26B or 26C) to read the contents of the data subset from the physical repository 80 and back them up by writing them to the data subset repository 82. As data subsets are written to the data subset repository 82, the backup manager 30A in FIG. 2A (or its counterparts 30B or 30C in FIGS. 2B and 2c) updates the data subset database 84 by identifying the data subsets that have changed in the current backup version. The corresponding indicators in the subset monitor change map 88 are then reset by the SDM 32A (or 32B or 32C) to "subset not changed," and serialization of the data set is released.

To recover a previous version of a data set, serialization is obtained for the data set and the extent range for the recovery is determined. Recovery to the requested backup version of a file may then be performed in two ways, either full recovery or partial, change-data-only recovery. Full recovery involves restoring forward from the base level version or and partial recovery involves restoring backward from the current version. Forward recovery processing is generally slower but may be necessary following a major disaster event. Backward recovery processing is quicker but requires a current data set that is valid. The SDM module 32A (or 32B or 32C) performs both types of recovery operation using services provided by the backup manager 30A in FIG. 2A (or its counterparts 30B or 30C in FIGS. 2B and 2C, respectively).

In a full recovery, forward processing operation, the SDM module 32A (or 32B or 32C) is called by the backup/recovery manager 28A (or 28B or 28C) and the recovery extent range is passed. The SDM module 32A (or 32B or 32C) will toggle/read the physical data repository change map 86 and atomically logically OR it with the contents of its own subset monitor change map 88. This is necessary to determine the data subsets in the physical data repository 80 which need to be rewritten with data subsets from previous versions. The indicators in the physical data repository change map 86 are then reset to "subset not changed" status. The backup/recovery manager 28A (or 28B or 28C) next establishes a CDO full recovery session with the backup manager 30A (or 30B or 30C), passing it the version number or date/time for the data set being requested. The backup manager 30A (or 30B or 30C) reconstructs the requested data set version using information contained in its data subset database 84. It first recalls all data subsets constituting the base level version of the data set. Then, if any data subsets were subsequently changed between the creation of the base level version and the creation of the requested version, the backup manager 30A (or 30B or 30C) recalls the first version of that data subset which is less than or equal to the requested version. When the requested data set is fully reconstructed, the subset monitor change map 88 is consulted and data subsets whose indicators are set to "subset changed" are written from the data set reconstructed by the data storage sub-system manager 26A (or 26B or 26C) to the physical data storage repository 80. The indicators in the subset monitor change map 88 are then reset to "subset not changed" status and serialization of the data set is released.

By way of example, assume it is desired to recover version 3 of a file containing data subsets 1–5. As shown in the data subset database 84 of FIG. 4, data subsets $V_1S_1$, $V_1S_2$, $V_1S_3$, $V_1S_4$ and $V_1S_5$, representing the base level version, are first recalled. Data subsets $V_1S_2$ and $V_1S_4$ are also valid for version 3 because they were not changed between the creation of version 1 and the creation of version 3. Data subsets 1, 3 and 5, however, were changed between the creation of versions 1 and 3. For those data subsets, the first versions thereof that are less than or equal to version 3 are $V_3S_1$, $V_3S_3$ and $V_2S_5$, respectively. Those versions are therefore recalled. The reconstructed data set consisting of $V_3S_1$, $V_1S_2$, $V_3S_3$, $V_1S_4$ and $V_2S_5$ is written to the physical data repository 80.

To perform a partial, backward recovery from the current version of a file to be recovered, the data set is again serialized and the SDM module 32A (or 32B or 32C) is called by the backup/recovery manager 28A (or 28B or 28C) and passed the recovery data subset extent range. The SDM module 32A (or 32B or 32C) will toggle/read the data storage subsystem manager's physical data repository change map 86 atomically logically OR it with its own subset monitor change map 88. This returns a list of data subsets that have changed since the last backup. The indicators in the physical data repository change map 86 are then reset to "subset not changed" status. The backup/recovery manager 28A (or 28B or 28C) next establishes a partial CDO recovery session with the backup manager 30A (or 30B or 30C), passing it the version number or date/time for the data set being requested, and the list of data subsets reported by the SDM module 32A (or 32B or 32C) as having changed since the last backup. The backup manager 30A (or 30B or 30C) then reconstructs the requested data set version from the information contained in its data subset database 84. It uses the information in the subset monitor change map 88, together with the information contained in the data subset database 84, to determine which data subsets must be recovered from a prior version. If the subset monitor change map 88 and the data subset database 84 indicate that a data subset has not changed since the requested backup version, the current version of the data subset in the physical data repository 80 is valid for the requested version. If either the subset monitor change map 88 or the data subset database 84 indicate that a data subset has changed since the requested version, the first version of that data subset which is less than or equal to the requested version is recovered by the data storage sub-system manager 26A (or 26B or 26C) and written to the physical data repository 80. The indicators in the subset monitor change map 88 are then reset to "subset not changed" status and serialization of the data set is released.

By way of example, assume it is desired to recover version 5 of a data set containing data subsets 1–5. Assume further, that the subset monitor change map 88 identifies data subsets 2 and 3 as having been changed since the last backup. For those data subsets, the first versions thereof that are less than or equal to version 5 are $V_4S_2$ and $V_4S_3$, respectively. Those versions are therefore recovered and written to the physical repository 80. The data subset database 84 further indicates that data subsets 1 and 5 were changed subsequent to version 5. For those data subsets, the first versions thereof that are less than or equal to version 5 are $V_5S_1$ and $V_2S_5$, respectively. Those versions are also recovered and written to the physical repository 80. The only data subset that has not changed since version 5 is data subset 4. The current version of that data subset in the physical data repository 80 is therefore valid.

Returning now to the data processing system 2 of FIG. 1, when a user application requests data from a data set that is part of a DARR session using CDO recovery, the data is recovered as needed/requested for the backup storage 8. Forward recovery processing is used when the current state of the data set is unknown to the user application (head crash or some other major problem) and full recovery beginning with a base level version, followed by the application of subsequent changes to recover to a desired version, is required. Backward recovery processing can be used when the current data set is intact but needs to be recovered to some previous state. In that case, only partial CDO recovery of changed data subsets (CDO segments) may be required. Read requests for unchanged data subsets can be satisfied from the active data set. Advantageously, changed data can be pre-staged using a locality of reference procedure in an attempt to anticipate the recovery pattern.

Figure 5A:
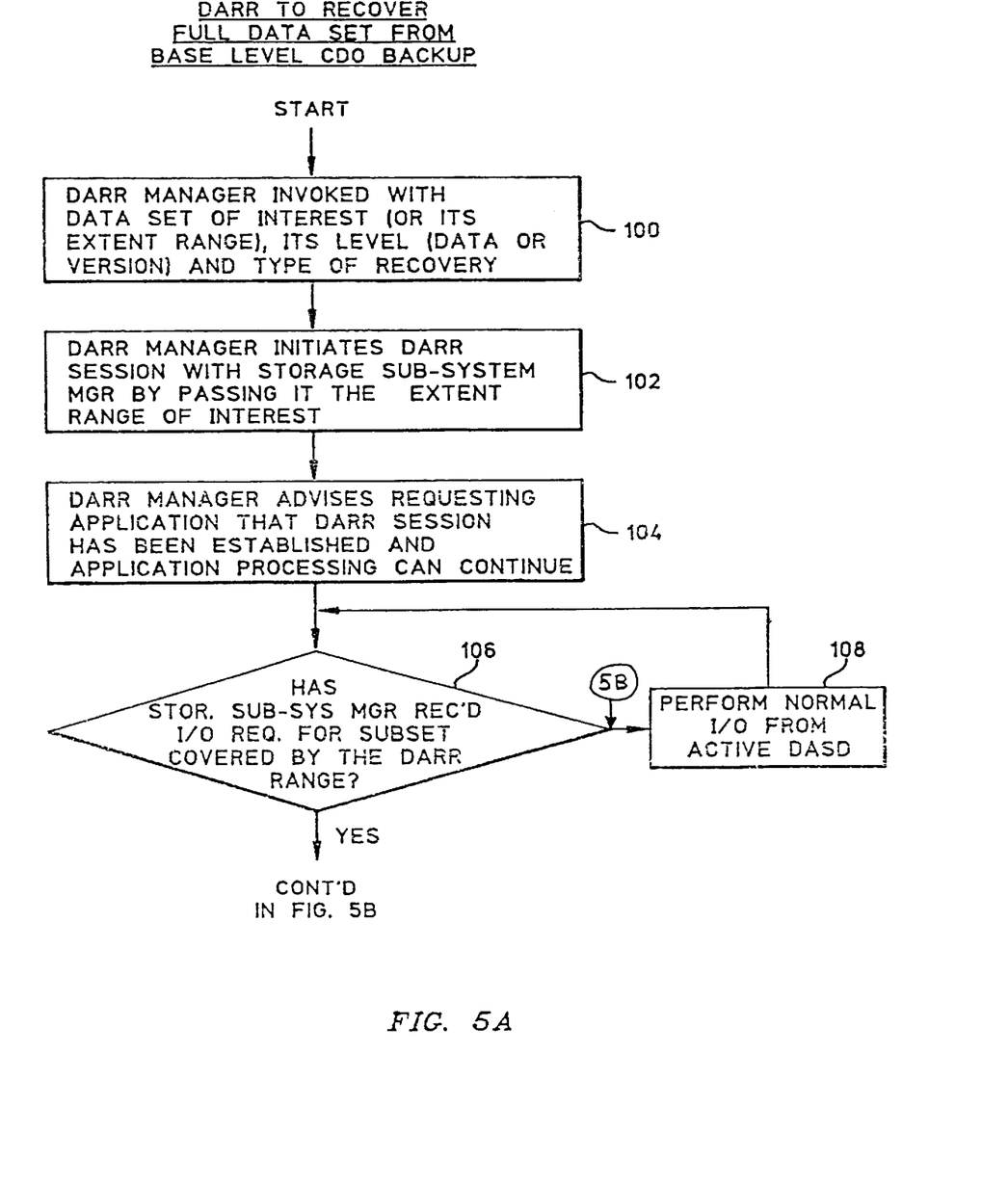
FIG. 5A is a partial flow diagram showing a first portion of a sequence of processing steps performed in accordance with still another aspect of the present invention.
Figure 5B:
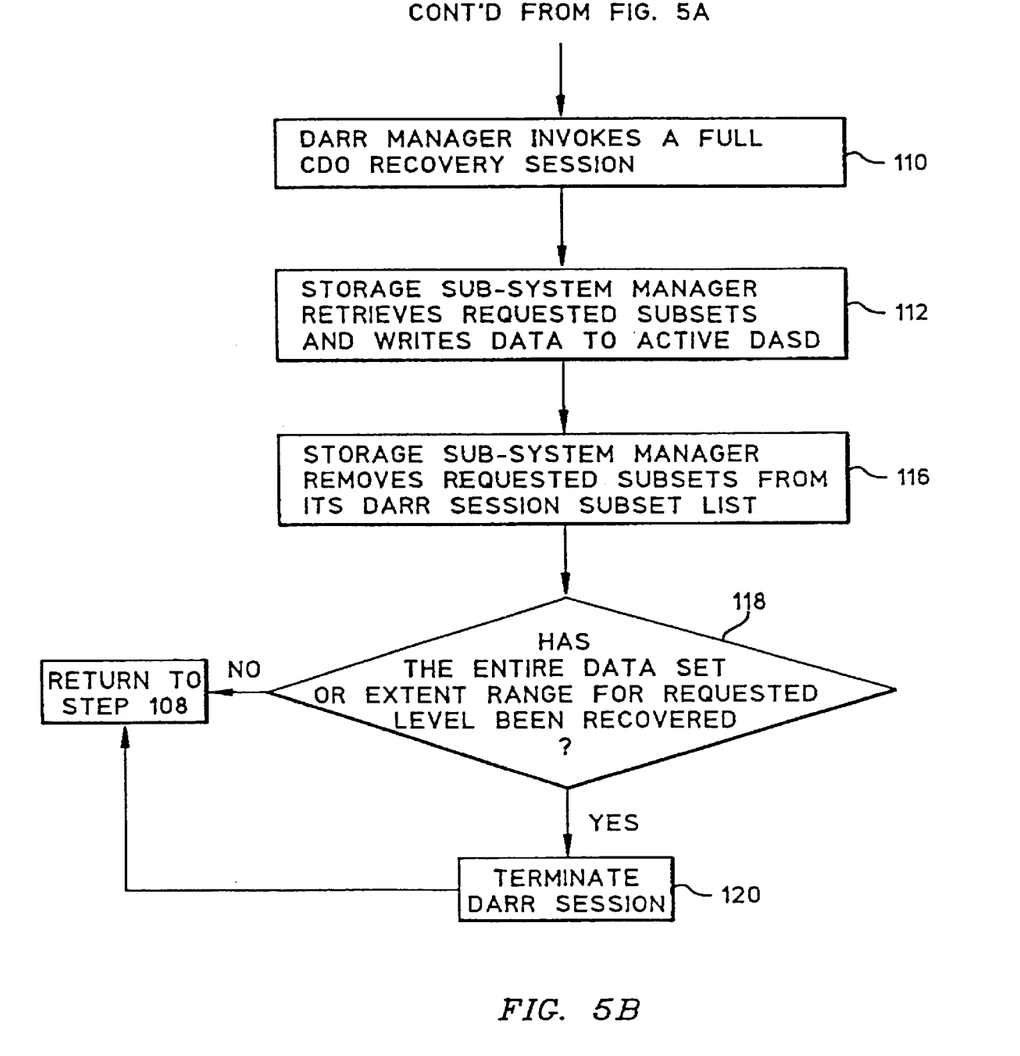
FIG. 5B is a partial flow diagram showing a second portion of the sequence of processing steps of FIG. 5B.

Referring now to FIGS. 5A and 5B, and with continuing reference to FIGS. 2A, 2B and 2C, a DARR full data set procedure is illustrated employing backward recovery processing. In step 100, the user application 22A (or 22B or 22C) causes the backup/recovery manager 28A (or 28B or 28C) to be invoked by the file control and access module 24A (or 24B or 24C) based on the user application requesting a data set of interest (or a data subset extent range), a data set level (date or version) and a type of recovery (full in this case). In step 102, the backup/recovery manager 28A (or 28B or 28C) initiates a DARR session with the data storage subsystem manager 26A (or 26B or 26C), passing it the data subset extent range of interest (the DARR range). In step 104, the backup/recovery manager 28A (or 28B or 28C) advises the requesting user application 22A (or 22B or 22C) that the DARR session has been established and its processing can continue (forward processing in the case of databases). In step 106, the data storage sub-system determines whether the user application 22 has made an I/O request, via the file control and access module 24A (or 24B or 24C), for a data subset covered by the DARR range. If the I/O request falls outside the DARR range, the system performs a normal I/O operation from active DASD in step 108.

If the user application 22 requests a data subset covered by the DARR range, the data storage sub-system manager 26A (or 26B or 26C) requests the backup/recovery manager 28A (or 28B or 28C) to perform a CDO full recovery to return the requested data subsets (or additional data subsets). When additional data subsets are requested, the backup/recovery manager 28A (or 28B or 28C) performs a locality of reference operation that anticipates future read requests for the additional data subsets that are pre-fetched from the backup storage 8. In step 112, the CDO full recovery operation results in the requested data subsets being written by the data storage sub-system 26A (or 26B or 26C) to active DASD storage 6. In step 116, the data storage sub-system 26A (or 26B or 26C) removes the requested data subsets from its list of DARR session data subsets. In step 118, the backup/recovery manager 28A (or 28B or 28C) determines whether the entire data set or the data subset extent range requested by the user application 22A (or 22B or 22C) has been recovered. If not, DARR session processing returns to step 108 to perform the next I/O request. If step 118 results in a TRUE output, the DARR session is terminated in step 120 and processing again returns to step 108 to perform the I/O request.

There are several ramifications of performing a full data set recovery DARR session as shown in FIGS. 5A and 5B. First, when data subsets are removed from the DARR session any subsequent reads for the same data subset will be satisfied from the active DASD storage 6. Second, any writes for data subsets prior to being removed from the DARR session will require that said subset be recovered to active DASD prior to allowing the write to be satisfied. Third, reads for any processor in a sysplex will be satisfied from a single DARR session. Finally, the DARR session will not be terminated until the entire data set or extent range has been recovered (this is true even if the using application terminates its session because its forward processing is complete). If the using application terminates any portions of the data have not been recovered through application access, the unrecovered data sets will be recovered and written to active DASD before the DARR session is terminated. In one sense, therefore, the DARR session commences a full recovery and the using application prioritizes the recovery process.

Figure 6A:
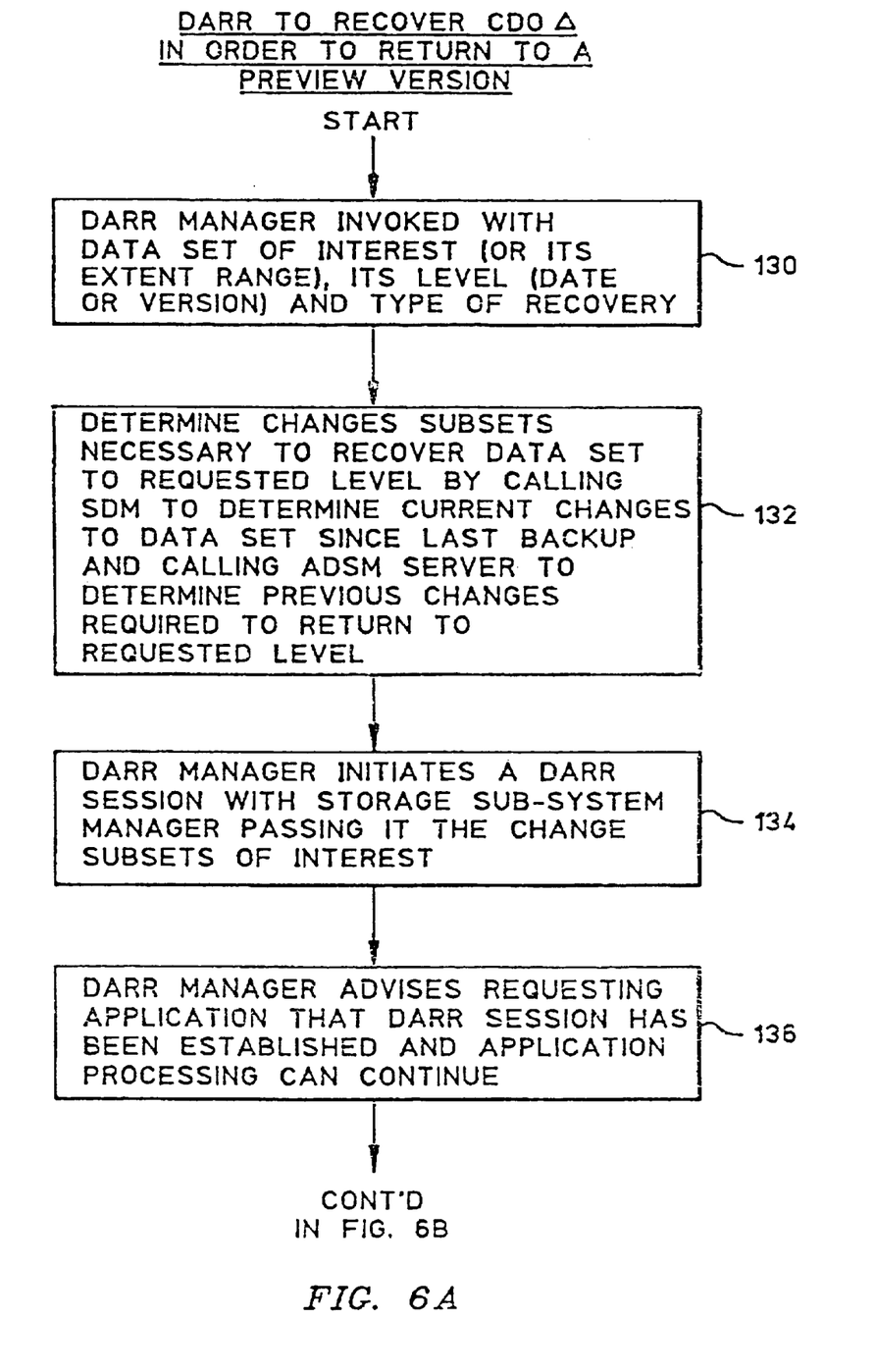
FIG. 6A is a partial flow diagram showing a first portion of a sequence of processing steps performed in accordance with still another aspect of the present invention.
Figure 6B:
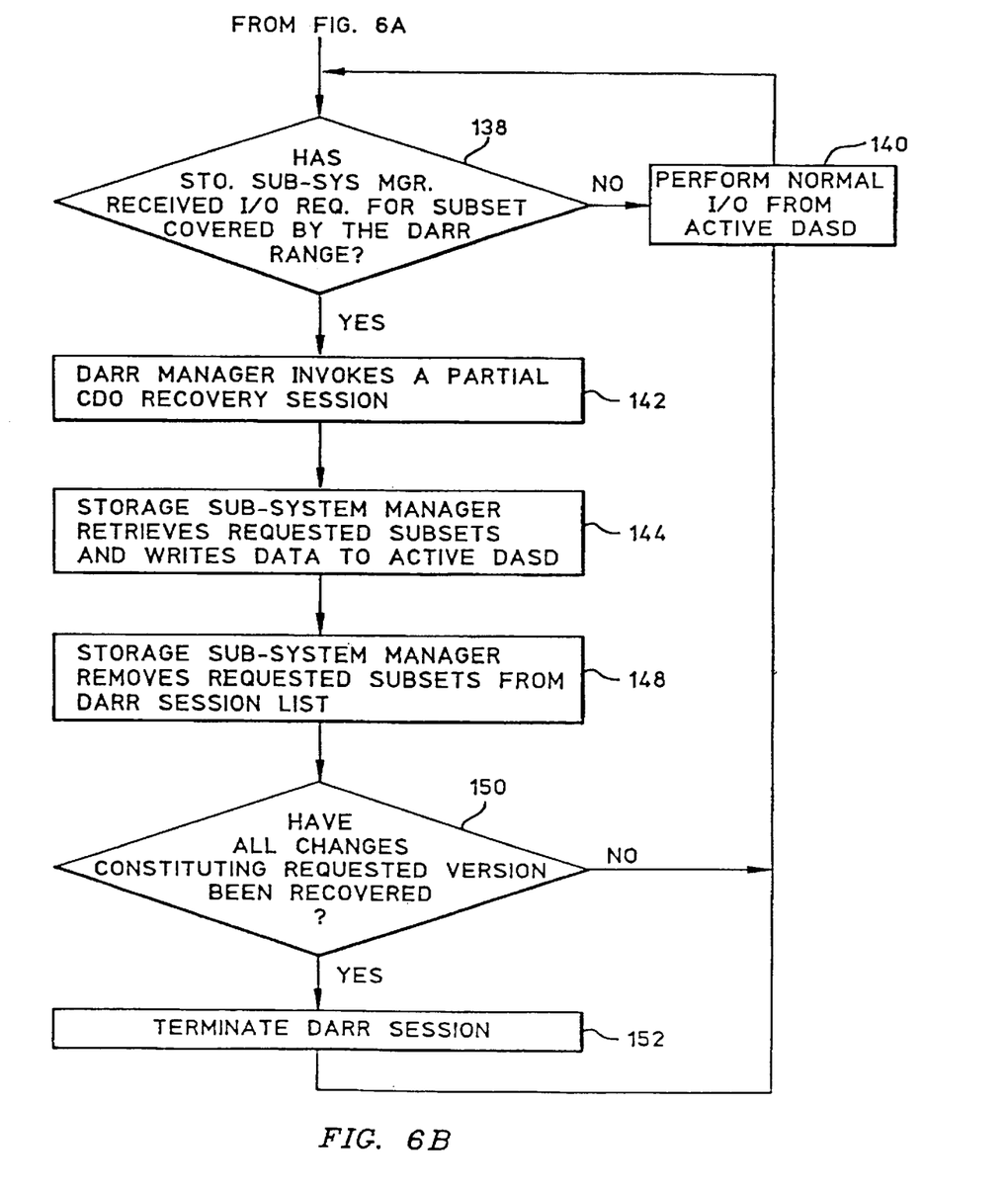
FIG. 6B is a partial flow diagram showing a second portion of the sequence of processing steps of FIG. 6B.

Turning now to FIGS. 6A and 6B, a DARR session using backward recovery processing to perform partial recovery is shown. In step 130, the user application 22A (or 22B or 22c) causes the backup/recovery manager 28A (or 28B or 29C) to be invoked by the file control and access module 24A (or 24B or 24C) based on the user application requesting a data set of interest (or a data subset extent range), a data set level (date or version) and a type of recovery (full in this case). In step 132, the backup/recovery manager 28A (or 28B or 28C) determines the changed data subsets necessary to recovery the requested data set to the requested level. As previously described in connection with full CDO recovery, it does this by calling the SDM module 32A (or 32B or 32C) to determine the current changes made to the data set since the last backup and by calling the backup manager 30A (and 30B and 30C) to determine the previous changes required to return to the requested level. In step 134, the backup/recovery manager 28A (or 28B or 28C) initiates a DARR session with the data storage subsystem 26A, passing it the data subset extent range of interest (the DARR range). In step 136, the backup/recovery manager 28A (or 28B or 28C) advises the requesting user application 22A (or 22B or 22C) that the DARR session has been established and its processing can continue (forward processing in the case of databases). In step 138, the data storage subsystem manager 26A (or 26B or 26C) determines whether the user application 22A (or 22B or 22C) has made a read request for a data subset covered by the DARR range. If a read request falls outside the DARR range, the system performs a normal read from active DASD in step 140.

If the user application 22 requests a data subset covered by the DARR range, the data storage sub-system manager 26A (or 26B or 26C) requests the backup/recovery manager 28A (or 28B or 28C) to perform a CDO partial recovery to return the requested data subsets (or additional data subsets). When requested to provide additional data subsets, the backup/recovery manager 28A (or 28B or 28C) performs a locality of reference operation that anticipates future read requests for the additional data subsets that are pre-fetched from the backup storage 8. In step 144, the execution of the partial CDO recovery operation results in the data storage sub-system manager 26A (or 26B or 26C) to write the requested version to active DASD storage 6. In step 148, the data storage sub-system manager 26A (or 26B or 26C) removes the requested data subsets from its DARR session list. In step 150, the backup/recovery manager 28A (or 28B or 28C) determines whether the entire data set or the data subset extent range requested by the user application 22A (or 22B or 22C) has been recovered. If not, DARR session processing returns to step 140 to perform the I/O request. If step 150 results in a TRUE output, the DARR session is terminated in step 152 and processing again returns to step 140 to perform the I/O request.

While various embodiments have been disclosed, it should be apparent that many variations and alternative embodiments would be apparent to those skilled in the art in view of the teachings herein. For example, It is understood, therefore, that the invention is not to be in any way limited except in accordance with the spirit of the appended claims and their equivalents.

We claim:

1. In a computerized data processing system including a computer platform operable under the control of system data including system programs, catalogs, directories, inventories and the like, and one or more user applications operable in conjunction with user data, said data processing system including a data backup and recovery system for periodically transferring data between one or more primary data storage resources and one or more secondary data storage resources, a method for recovering data from said secondary data storage resources to said primary data storage resources following a disaster event resulting in the loss of all or a portion of said data on said primary data storage resources, comprising the steps of:

recovering system data from said secondary data storage resources to said primary data storage resources;

starting the execution of one or more user applications;

determining whether any of said one or more user applications has requested non-recovered user data; and if non-recovered user data has been requested by said one or more user applications, recovering said requested data from said secondary data storage resources to said primary data storage resources.

2. The method of claim 1 further including the step of determining, prior to recovering requested user data, whether said requested data is demand-recoverable.

3. The method of claim 2 further including, after a predetermined time, recovering all remaining demand-recoverable user data and declaring all remaining user data that is not demand-recoverable lost.

4. The method of claim 1 wherein said one or more user applications continue normal processing while waiting for said requested data to be recovered.

5. The method of claim 1 wherein said step of recovering requested data from said secondary storage resources includes recovering an entire data set containing data requested by said one or more user applications.

6. The method of claim 1 wherein said step of recovering requested data from said secondary storage resources includes recovering only data subsets actually required by said one or more user applications.

7. The method of claim 6 wherein said step of recovering data subsets actually required by said one or more user applications includes a full recovery step of recovering said data subsets from a full backup version of all data subsets.

8. The method of claim 6 wherein said step of recovering data subsets actually required by said one or more user applications includes a change-data-only (CDO) recovery step of recovering only said data subsets that have changed between the time of a previous full backup of all data subsets and the time of a subsequent CDO backup version, or between the current time and the time of a previous CDO backup version.

9. The method of claim 1 wherein said step of recovering requested data from said secondary storage resources includes the steps of writing said requested data to active DASD and providing said requested data to said one or more user applications in response to said one or more user applications' request for data.

10. The method of claim 1 wherein said step of recovering requested data from said secondary storage resources includes recovering said requested data plus additional related data that may be requested by said one or more applications in the future.

11. In a computerized data processing system including a computer platform operable under the control of system data including system programs, catalogs, directories, inventories and the like, and one or more user applications operable in conjunction with user data, said data processing system including a data backup and recovery system for periodically transferring data between one or more primary data storage resources and one or more secondary data storage resources, a subsystem in combination with said computerized data processing system for recovering data from said secondary data storage resources to said primary data storage resources following a disaster event resulting in the loss of all or a portion of said data on said primary data storage resources, said subsystem comprising:

means for recovering system data from said secondary data storage resources to said primary data storage resources;

means for starting the execution of one or more user applications;

means for determining whether any of said one or more user applications has requested non-recovered user data; and     means responsive to said one or more user applications requesting non-recovered user data, for recovering said requested data from said secondary data storage resources to said primary data storage resources.

12. The combination of claim 11 further including means for determining, prior to recovering requested user data, whether said requested data is demand-recoverable.

13. The combination of claim 12 further including means for recovering, after a predetermined time, all remaining demand-recoverable user data and declaring all remaining user data that is not demand-recoverable lost.

14. The combination of claim 11 wherein said one or more user applications continue normal processing while waiting for said requested data to be recovered.

15. The combination of claim 11 wherein said means for recovering requested data from said secondary storage resources includes means for recovering an entire data set containing data requested by said one or more user applications.

16. The combination of claim 11 wherein said means for recovering requested data from said secondary storage resources includes means for recovering only data subsets actually required by said one or more user applications.

17. The combination of claim 16 wherein said means for recovering data subsets actually required by said one or more user applications includes full recovery means for recovering said data subsets from a full backup version of all data subsets.

18. The combination of claim 16 wherein said means for recovering data subsets actually required by said one or more user applications includes change-data-only (CDO) recovery means for recovering only said data subsets that have changed between the time of a previous full backup of all data subsets and the time of a subsequent CDO backup version, or between the current time and the time of a previous CDO backup version.

19. The combination of claim 11 wherein said means for recovering requested data from said secondary storage resources includes means for writing said requested data to active DASD and providing said requested data to said one or more user applications in response to said one or more user applications' request for data.

20. The combination of claim 11 wherein said means for recovering requested data from said secondary storage resources includes means for recovering said requested data plus additional related data that may be requested by said one or more applications in the future.

21. A method for demand-based data recovery management for use in a computerized data processing system including a computer platform operable under the control of an operating system, one or more user applications, and a plurality of data subsets used by said one or more user applications and stored on said computer platform, said method comprising the steps of:

generating an initial backup version of said data subsets by storing all of said data subsets on a backup data storage medium;

generating a backup/recovery manager database containing, for each of said data subsets that have been backed up, a data subset identifier and a backup version identifier therefor;

generating a data subset change map listing data subsets that have been changed by said one or more user applications following the generation of said initial backup version of said data subsets;

periodically generating subsequent backup versions of said data subsets by storing only said changed data subsets on said backup data storage medium and adding new entries to said backup/recovery manager database that identify said changed data subsets;

periodically recovering a prior backup version of said data subsets by either (1) recovering said initial backup version and any data subsets changed between the time of said initial backup version and the time of the requested backup version, or (2) recovering any data subsets changed between the current time and the time of the requested backup version and obtaining unchanged data sets from active storage.

\* \* \* \* \*

UNITED STATES PATENT AND TRADEMARK OFFICE
CERTIFICATE OF CORRECTION

PATENT NO. : 5,930,824
DATED : July 27, 1999
INVENTOR(S) : ANglin et al

It is certified that error appears in the above-identified patent and that said Letters Patent is hereby corrected as shown below:

ON TITLE PAGE, ITEM [54], and COL. 1, LINE 2,

Title of Patent should read

[54] SYSTEM AND METHOD FOR DEMAND-BASED DATA RECOVERY

Signed and Sealed this

Twenty-ninth Day of February, 2000

Attest:

Q. TODD DICKINSON

*Attesting Officer*  *Commissioner of Patents and Trademarks*